Figure 1:
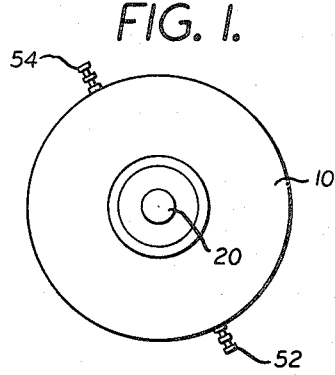

Aug. 19, 1958

H. H. ADISE ET AL 2,848,629

POTENTIOMETER

Filed Feb. 17, 1958

INVENTORS
HERBERT H. ADISE
HENRY SIEGEL
BY
Byrly, Townsend, Watson & Churchill
ATTORNEYS United States Patent Office 2,848,629
Patented Aug. 19, 1958

2,848,629

POTENTIOMETER

Herbert H. Adise and Henry Siegel, Great Neck, N. Y., assignors to Computer Instruments Corporation, Long Island, N. Y., a corporation of New York Application February 17, 1958, Serial No. 715,567

6 Claims. (Cl. 307—106)

The present invention relates to high speed rotary signal generators and more particularly to a signal generator employing a potentiometer for providing a signal indicative of the angular position of a shaft.

The principles of the present invention can best be explained in connection with a specific practical problem. A form of oscilloscope presentation used in radar requires a pair of double sawtooth voltage wave trains of opposite slope generated in step with rotation of the radar antenna. Thus, as the antenna makes one complete revolution two wave trains are generated. Each train consists of two sawtooth pulses, each having a duration less than 180°. In one train the pulses have a positive slope while in the other train the slope of the pulses is negative.

Heretofore it has been proposed that the required wave form can be generated by connecting in tandem two potentiometers each having a resistance element occupying the requisite number of angular degrees less than 180°. Two sliders 180° apart for each potentiometer are rotated in unison. A sawtooth will be generated as each slider wipes across its resistance element, the two wipers producing each a double sawtooth wave for each full revolution.

The foregoing arrangement has several serious drawbacks which materially reduce the life of the generator. With the resistance element occupying only a portion of the annulus traversed by the wiper there is a tendency for the wiper contact to bounce each time it encounters or leaves the element. This results in mechanical wear. More important, however, is the excessive wear resulting from the nature of the load into which the generator operates. This load usually includes a filter network containing shunt capacity. In any case, the load is capacitive due to stray wiring capacity as well as capacitive impedance to ground. Because of the capacitive load large current surges occur during the transient periods represented by the vertical sides of the sawtooth pulses. If these current surges are permitted to pass through the resistance element of the potentiometer, deleterous heat will be developed and the element will fail.

It is therefore an object of the present invention to provide a potentiometric type of signal generator which is free from the action of contact bounce.

It is a further object of the invention to provide a generator of the type described in which the capacitive surge currents are bypassed away from the resistance element.

Figure 2:
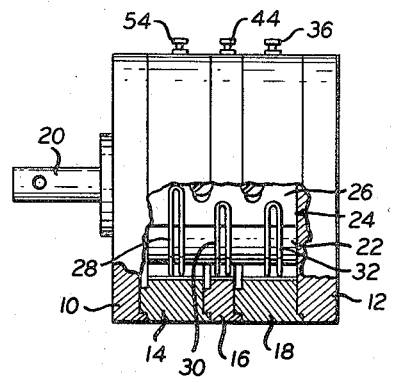
Figure 3:
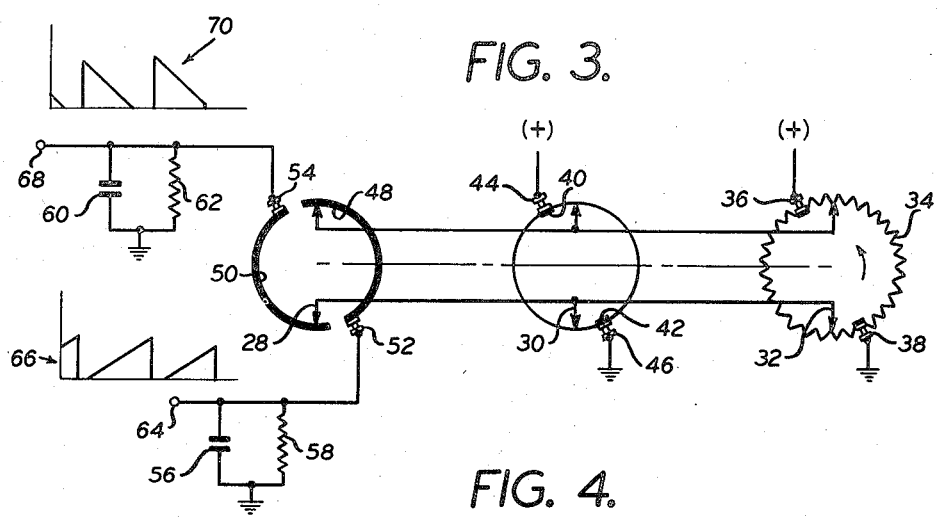
Figure 4:
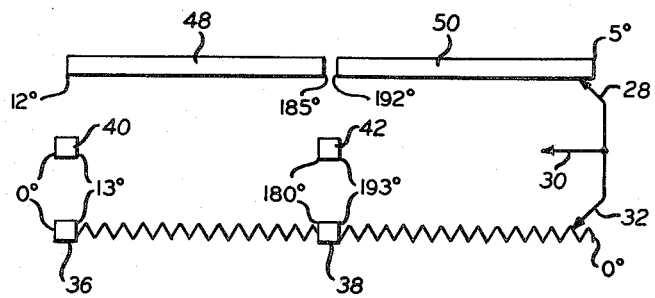

Further objects and advantages will appear after reading the following detailed description of a typical embodiment of the invention with reference to the appended drawing in which:

Fig. 1 is an end elevational view of a high speed rotary signal generator embodying the invention, Fig. 2 is a side elevational view partly in section of the generator of Fig. 1, Fig. 3 is an electrical schematic diagram of the potentiometer element, commutator segments, and shunt contact segments forming a part of the generator of Figs. 1 and 2, and Fig. 4 is a developed schematic representation of some of the elements of Fig. 3 to assist in the description.

Referring now to Figs. 1 and 2, the generator consists of end bells 10 and 12 between which are sandwiched three ring members 14, 16 and 18. A shaft 20 is journalled in the end bells and has supported along its central portion an insulated rotor member 22 on which is mounted two wiper bar assemblies of which only one is visible in the drawing at 24. The wiper bar assembly 24 includes a wiper bar 26 to which is secured by soldering or otherwise three wiper contacts 28, 30 and 32. The three contacts are electrically interconnected through the wiper bar. The second wiper bar assembly is identical to the assembly 24 and is secured to the insulated rotor on the opposite side so that the contacts are spaced exactly 180° from contacts 28, 30 and 32. Upon rotation of the shaft 20, the wiper contacts sweep over the inner surfaces of the respective rings 14, 16 and 18.

The entire inner surface of ring member 18 is coated with a precision carbon film providing a continuous resistance element such as schematically represented at 34 in Fig. 3. The nature of the carbon film is well known and forms no part of the present invention. Suffice it to say that it should have a hard wearing surface. A pair of terminals 36 and 38 are mounted in ring 18 so as to make contact with the resistance element 34 at diametrically opposite points.

The inner surface of ring member 16 is smooth and insulating except for two short contact surfaces 40 and 42 diametrically disposed. These contacts may be formed by suitable electroplating processes from copper, silver, gold or the like and are joined to terminal posts 44 and 46. The phasing of the contacts 40 and 42, which are herein referred to as the shunt contact segments, will be described below with reference to Fig. 4.

Finally ring 14 has its inner surface provided with two equal length commutator segments 48 and 50 formed by electroplating and joined respectively to terminal posts 52 and 54.

Referring to Fig. 4, the relative phasing of a typical assembly is shown. It will be assumed that the wiper contacts move from right to left and that the drawing shows the ring members in developed form. The various segments will start and stop at the angular positions indicated in the drawing. It should be observed that there is a 5° overlap between the shunt contact and the adjacent commutator segment as the wipers commence to traverse the commutator segment. This may be referred to as the leading edge overlap. The trailing edge overlap will be observed to be 1°.

Let it be assumed as seen in Fig. 3 that output terminal 52 is connected to a filter network consisting of shunt capacitor 56 and shunt resistor 58. Similarly, assume a filter network 60, 62 connected to terminal 54. Also assume that the positive terminal of a direct current voltage source is connected to terminals 36 and 44 while the negative or grounded side of the source is connected to terminals 38 and 46. Also assume that at time equal zero the wipers are in the position shown in the drawing and that they commence to rotate counterclockwise. It will be appreciated that the voltage appearing at output point 64 will be represented by the wave train 66 while the voltage at point 68 will be represented by the wave train 70 for one complete revolution.

Referring to wave train 66 it should be noted that the voltage across capacitor 56 must drop from the positive potential of the source to ground potential during the interval that one wiper leaves the trailing edge of commutator segment 48 and the other wiper engages the leading edge of segment 48. At high speed, the charge cannot leak off completely through resistor 58 and therefore the remainder would discharge through the potentiometer element as the associated wiper passes terminal 38 in the absence of shunt segment 42. In the present assembly, the charge will leak off through segment 42 to ground during the 5° overlap interval. In a similar manner it can be shown that the current required to charge capacitor 60 up to source potential at the beginning of a negative slope sawtooth is supplied directly through shunt segment 40.

Thus, all of the surge currents are passed through highly conductive contacts and bypassed away from the resistance element. This entirely eliminates the source of localized heating. At the same time, the continuous resistance element provides an uninterrupted surface to the wiper contacts eliminating mechanical bounce and attendant wear. In this manner the objects of the invention are attained.

The invention has been described with reference to a typical specific embodiment but is subject to wide modification. The actual extent of the overlap areas is not critical although it is important that there be a leading edge overlap between the shunt contact segment and the corresponding commutator segment. It may be desirable to transpose the roles of the commutator segments and their wipers by fixing the wipers and rotating the segments but this will tend to complicate the assembly. Likewise, other means may be provided for coupling the wipers which engage the shunt segments and the potentiometer element to the output terminal posts of the device. Various other modifications will occur to those skilled in the art and it is intended to cover all these by the appended claims.

What we claim is:

1. High speed rotary signal generator comprising an annular potentiometer element, terminals for connecting at least a portion of said element across a source of direct current voltage, the portion between said terminals occupying less than 360°, a shunt contact segment, terminal means for connecting said shunt contact segment to said source of voltage, output terminal means for connection to a capacitive load, rotary means including at least two conductive wiper contacts ganged together for conjoint rotation and eletcrically interconnected, said wipers being arranged to engage and wipe across respectively said potentiometer element and said shunt contact segment once each cycle, said segment being of such relative length and said wipers being phased such that said shunt contact segment is engaged by its wiper contact for a brief interval only at the beginning of each traverse across the said portion of the potentiometer element by its wiper contact, and means for coupling the output of said wiper contacts to said output terminal means during at least that portion of a cycle when the corresponding wiper is traversing the said portion of the potentiometer element whereby the load is connected directly to the voltage source for a brief interval at the beginning of each such traverse to bypass current surges through the capacitive load away from said potentiometer element.

2. High speed rotary signal generator comprising a potentiometer element, terminal means for connecting at least a portion of said element across a source of direct current voltage, a conductive commutator segment, terminal means for connecting said segment to a capacitive load, a shunt contact segment, terminal means for connecting said shunt contact segment to said source of voltage, and at least three conductive wiper contacts ganged together for conjoint rotation and electrically interconnected, said wipers being arranged to engage and wipe across respectively said potentiometer element, said commutator segment and said shunt contact segment once each cycle, said segments being of such relative length and said wipers being phased such that said shunt contact segment is engaged by its wiper contact for a brief interval only at the beginning of each traverse across the commutator segment by its wiper contact whereby the load is connected directly to the voltage source for a brief interval at the beginning of each cycle to bypass current surges through the capacitive load away from said potentiometer element.

3. High speed rotary signal generator comprising a plurality of sets each consisting of a potentiometer element, a conductive commutator segment and a shunt contact segment, terminal means for connecting the potentiometer element of each set across a source of direct current voltage, terminal means for connecting the commutator segment of each set to an independent capacitive load, terminal means for connecting the shunt contact segment of each set to said source of voltage, and at least one group of three electrically interconnected conductive wiper contacts all ganged together mechanically for conjoint rotation, said group of wipers being arranged to engage and wipe across respectively the potentiometer element, commutator segment and shunt contact segment of each set in succession once each cycle, said segments being of such relative length and said wipers being phased such that said shunt contact segments are engaged by the corresponding wiper contact for a brief interval only at the beginning of each traverse across the corresponding commutator segments by their corresponding wiper contact whereby the loads are connected directly to the voltage source for a brief interval at the beginning of each such traverse to bypass current surges through the capacitive loads away from the potentiometer elements.

4. High speed rotary signal generator according to claim 3, wherein the number of groups of wipers is equal to the number of said sets.

5. High speed rotary signal generator comprising a potentiometer element in the form of a continuous ring, a pair of terminals joined to said ring at diametrically opposed points for connecting the element across a source of direct current voltage, a pair of arcuate commutator segments of equal length in the form of a split ring with equal gaps therebetween, a terminal for each segment for connecting it to a capacitive load, a pair of shunt contact segments each having a length slightly greater than the gaps between said commutator segments, terminal means for connecting said shunt contact segments to opposite sides of said voltage source, and at least three conductive wiper contacts ganged together for conjoint rotation and electrically interconnected, said wipers being arranged to engage and wipe across respectively said potentiometer element, said commutator segments, and said shunt contact segments once each cycle, said wipers being phased such that the shunt contact segments are engaged by the corresponding wiper contact for a brief interval only at the beginning of each traverse across a commutator segment by the corresponding wiper contact whereby the loads are connected directly to the voltage source for a brief interval at the beginning of each such traverse to bypass current surges through the capacitive load away from said potentiometer element.

6. High speed rotary signal generator according to claim 5, further comprising three more conductive wiper contacts electrically interconnected between themselves but insulated from said first three contacts, said three more contacts being ganged together and to said first three contacts for conjoint rotation, said three more contacts being disposed 180° out of phase with respect to said first three contacts and being associated one with each for respective engagement with said potentiometer, said commutator segments, and said shunt contact segments.

No references cited.